Jan. 25, 1966 R. J. HARKER 3,230,831
VIBRATION DAMPER FOR MACHINE TOOLS
Filed June 7, 1963 8 Sheets-Sheet 1

INVENTOR
RALPH J. HARKER
by: Wolf, Hubbard, Voit & Osann
ATTYS.

Jan. 25, 1966  R. J. HARKER  3,230,831
VIBRATION DAMPER FOR MACHINE TOOLS
Filed June 7, 1963  8 Sheets-Sheet 2
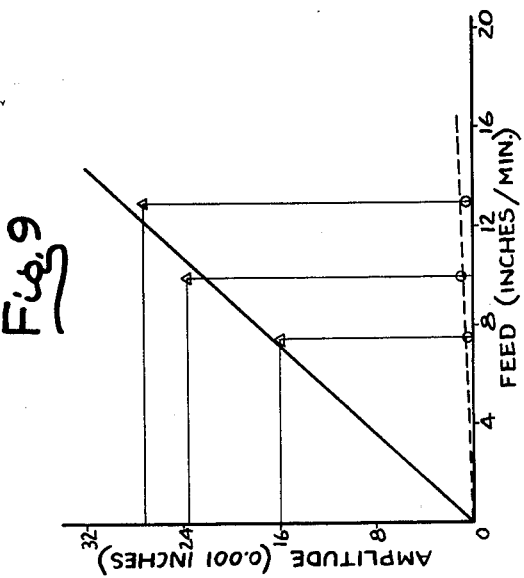
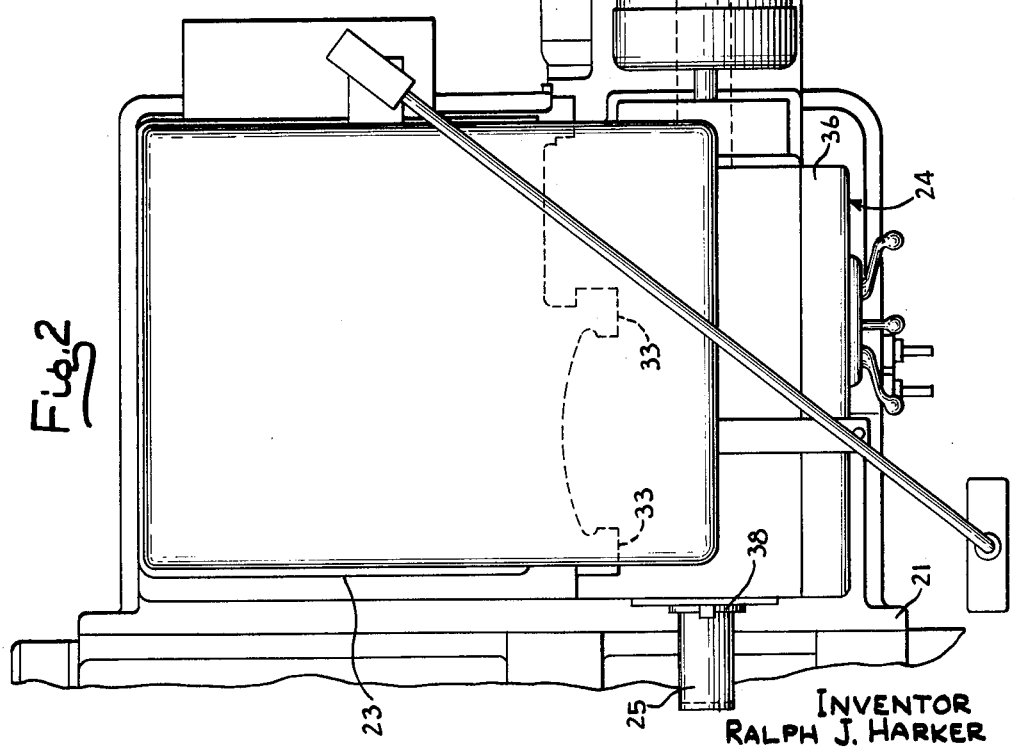
INVENTOR
RALPH J. HARKER
by: Wolfe, Hubbard, Voit & Osann
ATTYS

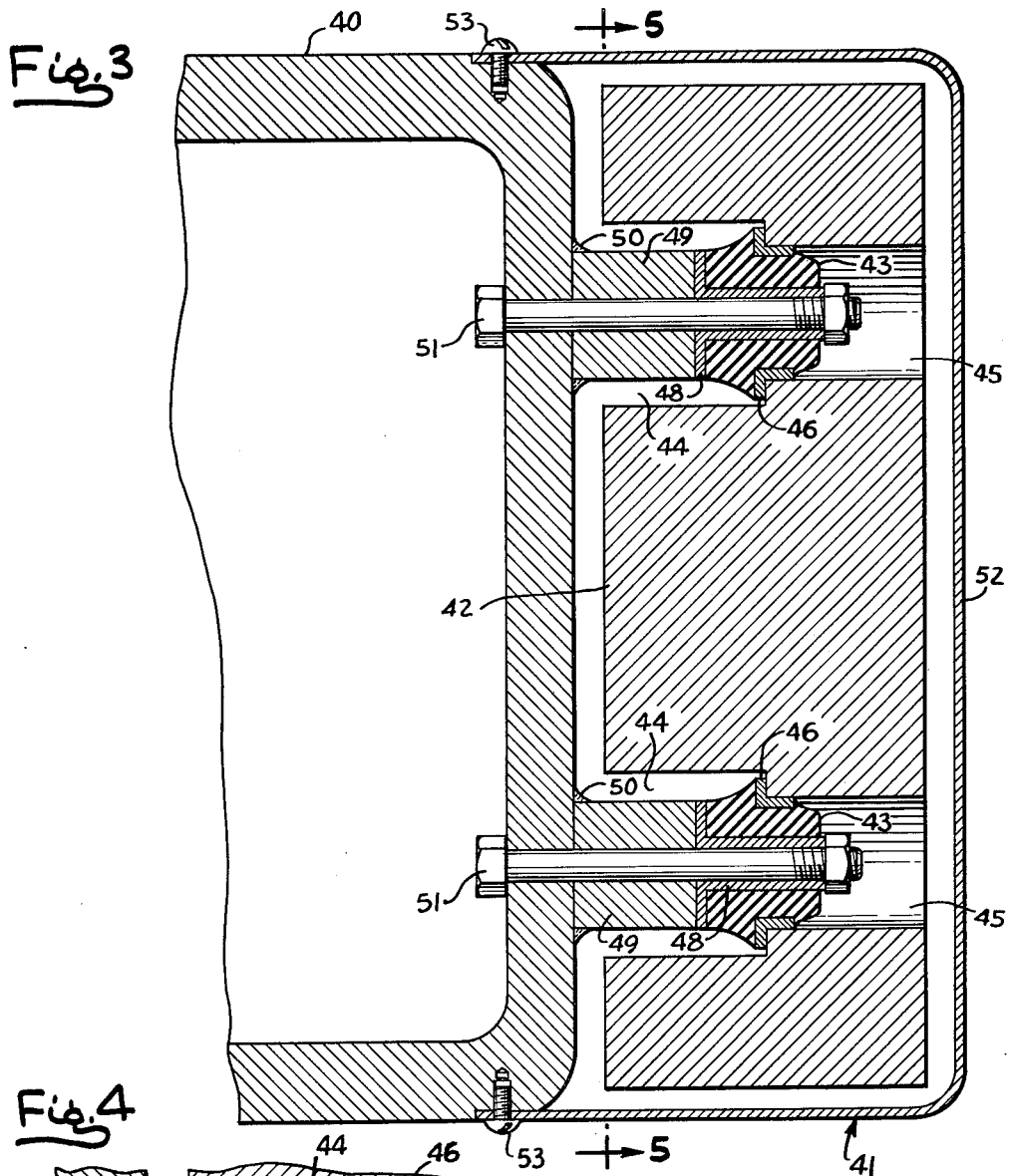

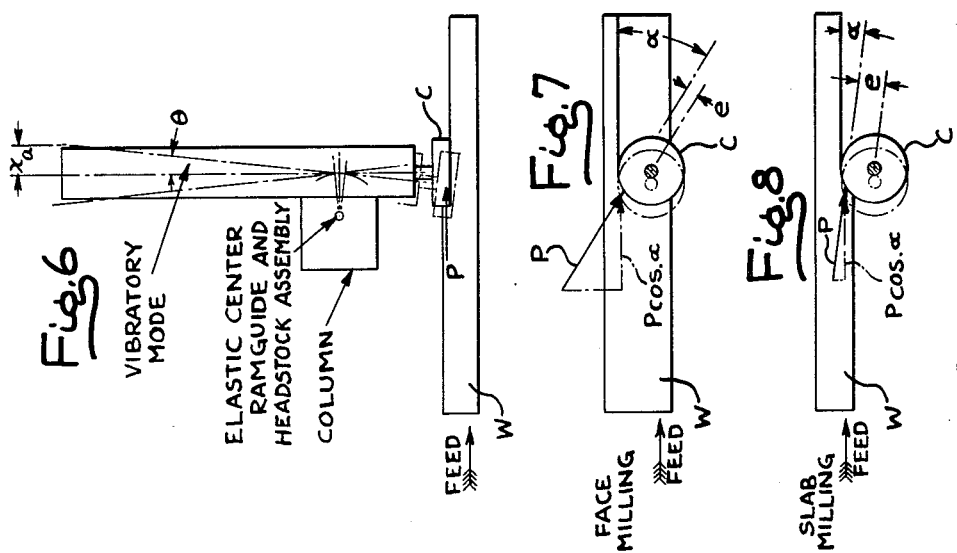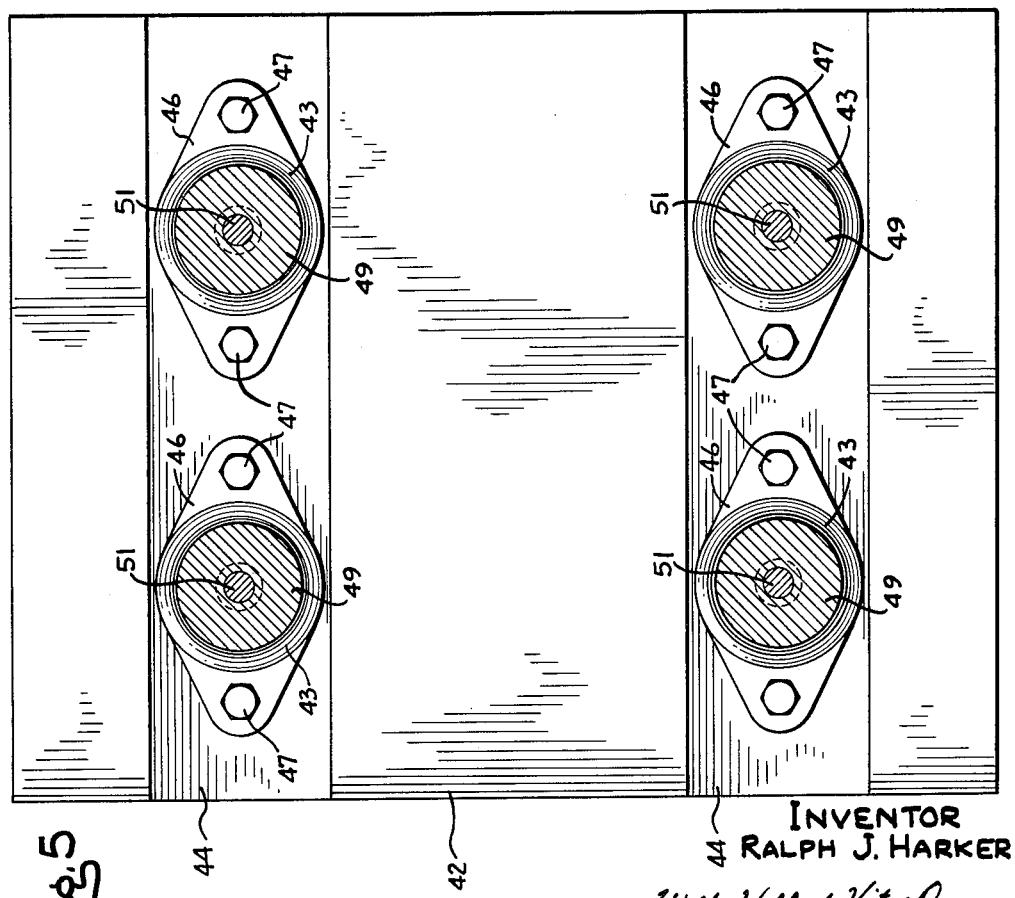

Jan. 25, 1966 R. J. HARKER 3,230,831
VIBRATION DAMPER FOR MACHINE TOOLS
Filed June 7, 1963 8 Sheets-Sheet 5

INVENTOR.
RALPH J. HARKER
BY
Wolfe, Hubbard, Voit & Osann
ATTYS

Jan. 25, 1966 R. J. HARKER 3,230,831
VIBRATION DAMPER FOR MACHINE TOOLS
Filed June 7, 1963 8 Sheets-Sheet 6
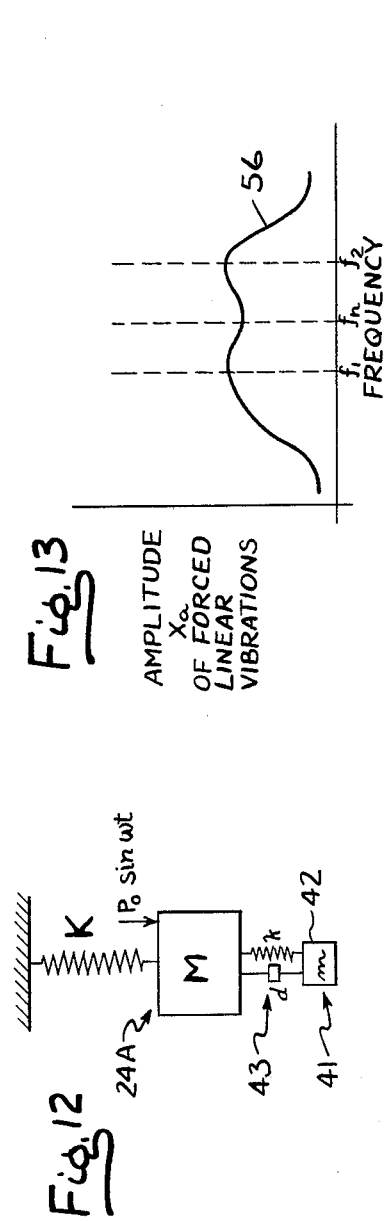
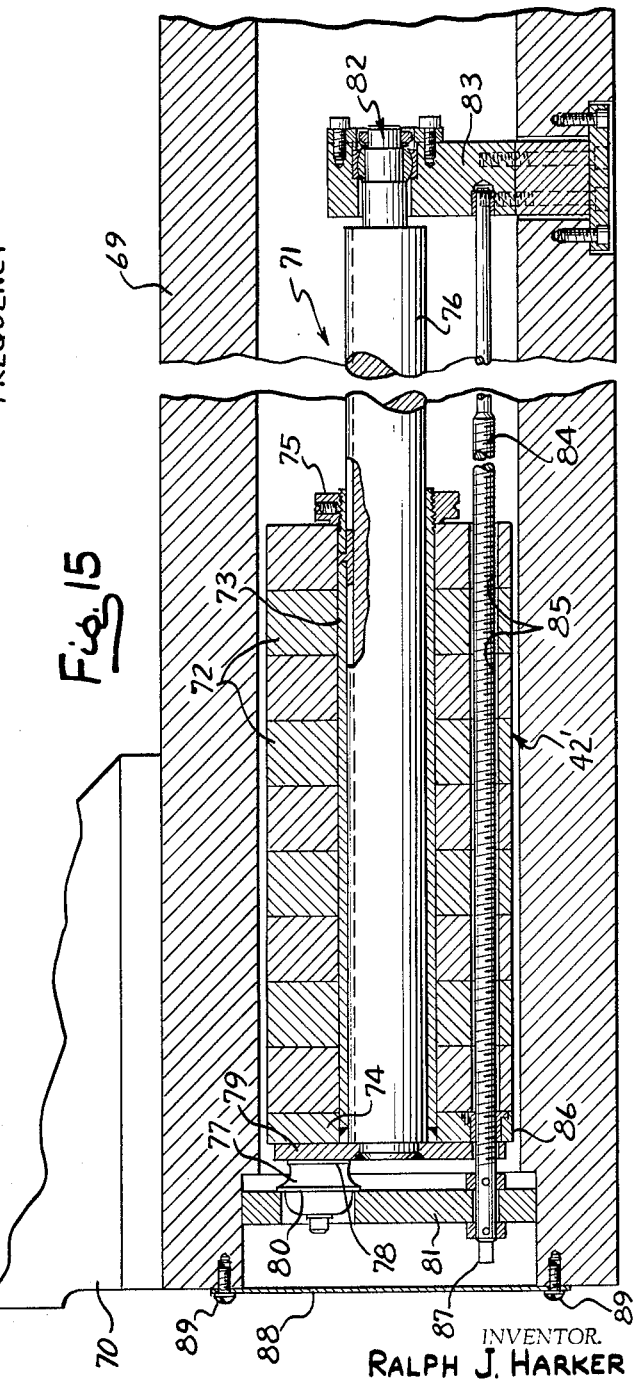
INVENTOR.
RALPH J. HARKER
BY
Wolfe, Hubbard, Voit & Osann
ATTYS.

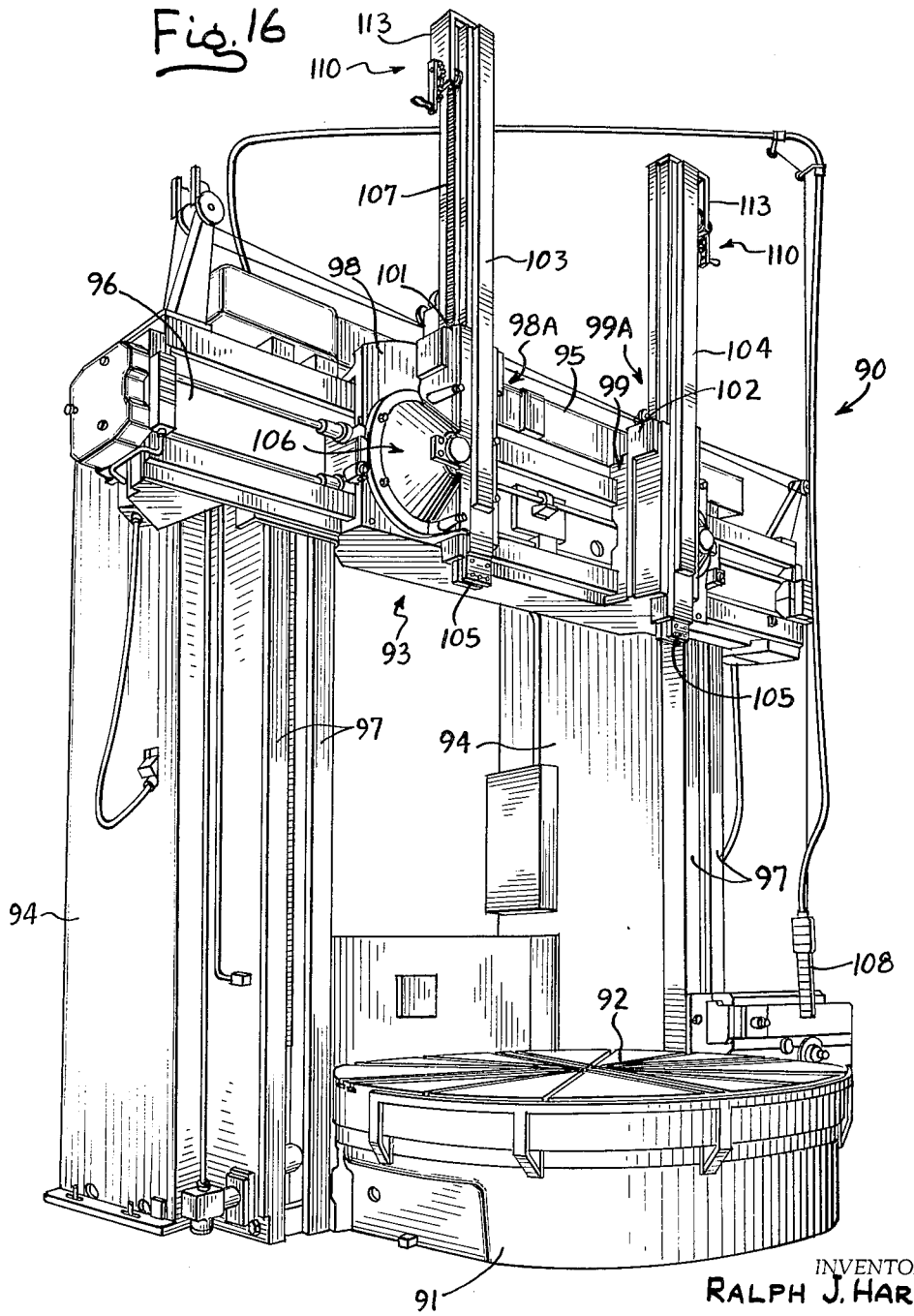

Jan. 25, 1966 R. J. HARKER 3,230,831
VIBRATION DAMPER FOR MACHINE TOOLS
Filed June 7, 1963 8 Sheets-Sheet 8
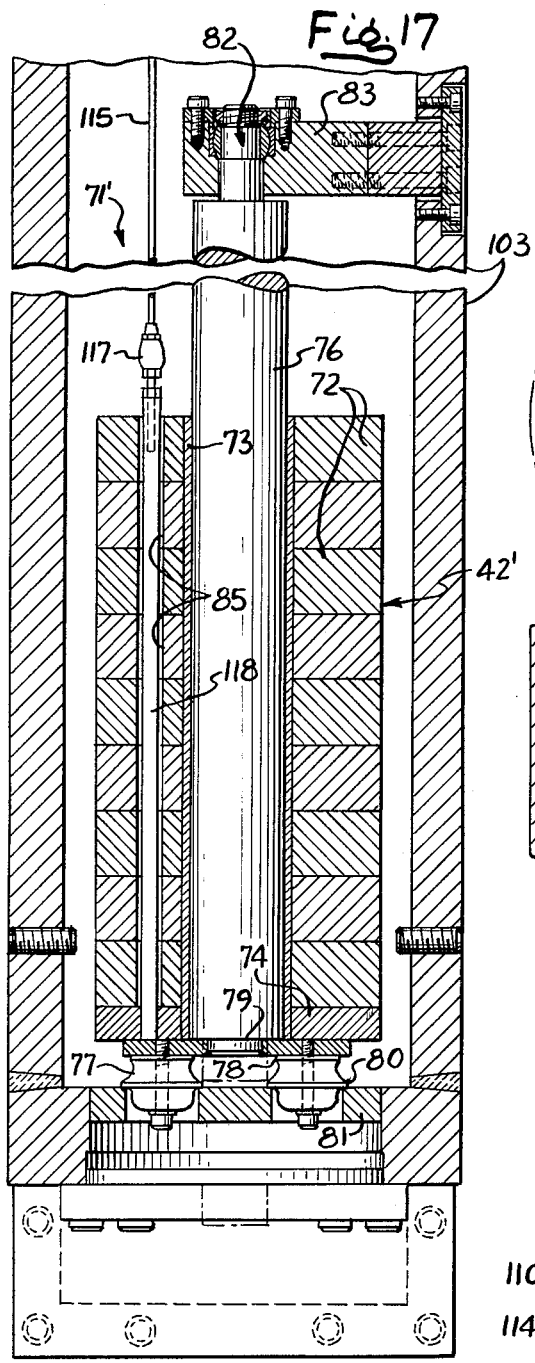
Fig. 17
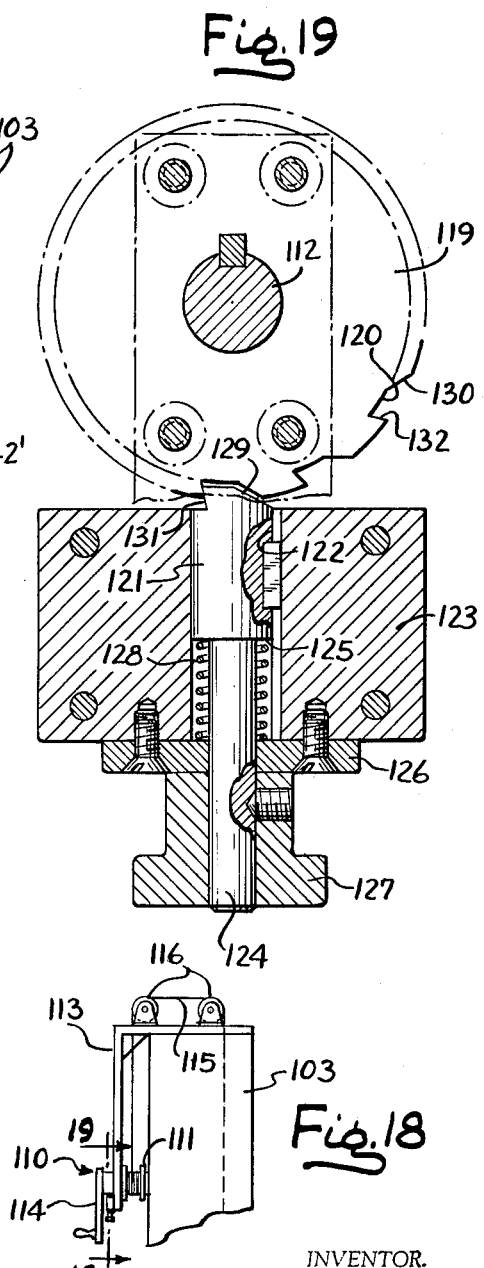
Fig. 19
Fig. 18
INVENTOR.
RALPH J. HARKER
BY
Wolfe, Hubbard, Voit & Osann
ATTYS.

United States Patent Office 3,230,831
Patented Jan. 25, 1966

3,230,831
VIBRATION DAMPER FOR MACHINE TOOLS
Ralph J. Harker, Madison, Wis., assignor to Giddings & Lewis Machine Tool Company, Fond du Lac, Wis., a corporation of Wisconsin
Filed June 7, 1963, Ser. No. 288,578
24 Claims. (Cl. 90—11)

The present invention relates in general to machine tools and, more particularly, to an improvement in those classes of machine tools characterized by their ability to perform boring, milling, or similar machining operations. In its principal aspects, the invention is concerned with an improved system for damping forced vibrations in the tool supporting structure, thus not only insuring an improved surface finish for the workpiece, but moreover permitting such machining operations to be carried out at a higher rate of speed.

This application is a continuation-in-part of my co-pending application, Serial No. 848,324, filed October 23, 1959, now abandoned.

Machine tools of the foregoing classes have been manufactured for many years and are still being manufactured at the present time. These types of machines characteristically include a structurally supported saddle carrying one or more translatable tool supports adapted to hold a variety of milling cutters, boring bars, or other tools and attachments.

In the operation of such machines, vibration and tool chatter have heretofore been a perennial problem, placing an undue limitation on the metal removal rate of the machine and on the life of many of its parts. Various approaches have heretofore been attempted in an effort to solve this problem, all with varying degrees of success. For example, one approach has been to increase the rigidity of the machine by tightening such things as bearing adjustments, gibs, and spindle bearings. Another approach has been simply to increase the rigidity of the workholding fixture. Attempts have also been made to deal with the problem by applying torsional vibration dampers to the spindle drive transmission. Perhaps the most common way to deal with the problem, however, has been to operate the machine at a combination of feed and speed at which vibration and chatter are kept within tolerable limits. However, the foregoing approaches have not provided a satisfactory solution to the problem.

Accordingly, it is a general aim of the present invention to minimize vibration and chatter in machine tools of the type characterized by their ability to perform boring, milling, or similar machining operations so as to increase the metal removal rate of the machine, improve surface finish, and prolong tool life, without altering in any way the basic construction of the machine.

Another object of the invention is to provide machines of the character set forth and in which vibration and chatter are minimized by taking advantage of the characteristic structural arrangement of the particular machines involved.

In another of its important aspects, it is an object of the invention to provide a vibration damping system for machines of the character set forth and which is effective over a wide range of different selectable positions of the tool relative to its supporting structure.

A more specific object of the invention is to provide a tuneable vibration damping system which permits of ready adjustment for the purpose of maximizing the damping effect of the system under different amplitude conditions of the forced vibrations, which conditions result from varying amounts of extension of the tool relative to its supporting structure. Thus, while not so limited in its application, the invention will find especially advantageous use with those types of machines employing extensible rams or extensible underarm supports.

Another object of the invention is to provide an effective vibration damping system which permits of installation with machines of the character set forth and which are currently being used at less than optimum efficiency because of the problems attendant forced vibration and tool chatter.

Still another object is to provide, in machines of the type set forth above, an arrangement for achieving the foregoing objectives with little or no increase in cost.

Other objects and advantages will become apparent as the following description proceeds, taken in the light of the accompanying drawings, wherein:

FIG. 2 is an enlarged plan view of the headstock and column portion of the machine in FIG. 1;

FIG. 3 is an enlarged vertical sectional view taken adjacent the end of the ram guide of the machine and substantially in the plane of the line 3—3 in FIG. 2;

FIG. 4 is a further enlarged sectional view detailing a portion of the structure shown in FIG. 3;

FIG. 5 is a vertical sectional view taken substantially in the plane of the line 5—5 in FIG. 3 and showing the inside face of the inertia member of the damper unit assembly;

FIG. 6 is a diagrammatic plan view illustrating the ram guide and headstock assembly, the cutting tool, and work under certain conditions of operation;

FIGS. 7 and 8 are diagrammatic end views of the work and cutting tool illustrated in FIG. 6 and depicting two different operating conditions;

FIG. 9 is a graph illustrating diagrammatically the effectiveness of one specific embodiment of the invention;

FIG. 12 is a diagrammatic view similar to FIG. 10, here illustrating a damped dynamic vibration damper;

FIG. 13 is a graph similar to FIG. 11 here illustrating the effect resulting from attachment of a vibration damper of the type shown in FIG. 12 to the exemplary ram guide and headstock assembly;

FIG. 15 is an enlarged, fragmentary, sectional view taken longitudinally through the outboard end of the underarm support shown in FIG. 14 and here depicting details of the modified form of damper assembly;

FIG. 16 is a perspective view of a vertical boring machine here embodying the features of the present invention;

FIG. 17 is an enlarged, fragmentary, vertical sectional view similar to FIG. 15 here taken longitudinally through one of the extensible rams used with the vertical boring machine shown in FIG. 16;

FIG. 18 is an elevational view, on a slightly enlarged scale, of the upper portion of one of the rams shown in FIG. 16, here depicting details of the damper adjusting mechanism; and, FIG. 19 is an enlarged sectional view taken substantially in the plane of the line 19—19 in FIG. 18.

Figure 1:
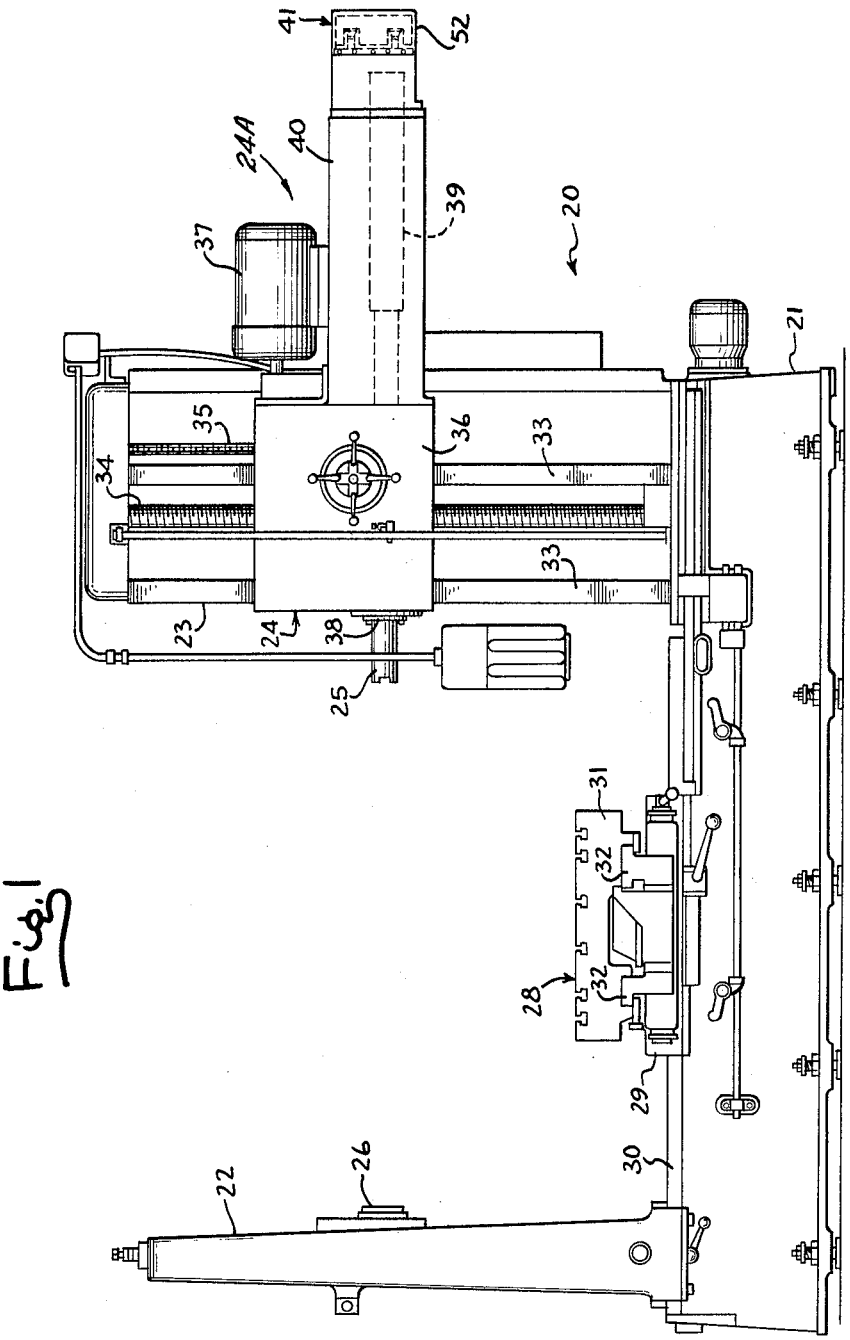
FIGURE 1 is a front elevation view of an illustrative boring and milling machine here embodying features of the present invention.

While the invention is susceptible of various modifications and alternative constructions, specific embodiments thereof have been shown by way of example in the drawings and will herein be described in detail. It should be understood, however, that it is not intended to limit the invention to the particular forms disclosed, but, on the contrary, the intention is to cover all modifications, alternative constructions and equivalents falling within the spirit and scope of the invention as expressed in the appended claims.

Referring more specifically to FIGS. 1–13 of the drawings, the invention is there exemplified in an illustrative horizontal boring and milling machine 20 of the general type disclosed in United States Patent No. 2,643,441 issued June 30, 1953, on the application of Keith F. Gallimore. While those skilled in the art will recognize such a machine as being of a well-known type in wide commercial use, it will be helpful for present purposes to outline briefly the salient features of the machine.

In general, the machine 20 comprises a horizontal bed 21 having a tailstock column 22 at one end and a headstock column 23 at the other end. The headstock column has mounted thereon a vertically adjustable headstock 24 having a horizontally disposed, axially slidable tool spindle 25.

The tailstock column 22 has a vertically adjustable tailstock 26 adapted to cooperate with the spindle 25 in supporting a boring bar or other relatively long tool member (not shown). To accommodate boring bars or similar tool members of different lengths, the tailstock column 22 is mounted for adjustment longitudinally of the machine bed 21.

A carriage 28, adjustably supported on the bed, is adapted to present work to the tool on spindle 25. In this instance, the carriage comprises a saddle 29 slidably mounted on spaced parallel ways 30 on top of the bed for movement longitudinally therealong. The saddle, in turn, carries a work supporting table 31 mounted for movement transversely of the machine bed on ways 32 formed in the top of the saddle.

The headstock column 23 comprises an upright casting rigidly fixed to the top of the bed 21 adjacent one end of the same. On its front face, the column 23 has spaced parallel vertical ways 33 for supporting and guiding the headstock 24 vertically. The headstock may be adjustably positioned in a vertical direction by means of a feed screw 34 rotatably anchored at its upper end in the headstock column and coacting with a fixed nut carried by the headstock. At its lower end, the feed screw is connected to an appropriate driving mechanism (not shown) housed within the machine bed 21. The headstock in the present instance is also counterbalanced by means of an appropriate weight housed within the headstock column and connected with the headstock 24 by means of a chain or other flexible member 35.

The headstock 24 comprises a housing 36 which contains the spindle 25 and the gearing for driving and feeding the same. Power for the drive and feed is derived from motor 37 also fixed to the headstock housing. In some machines, however, power for the headstock may be derived from an appropriate transmission in the bed of the machine and delivered to the headstock through a vertically disposed splined shaft (not shown).

The spindle 25 is supported for both speed and feed drives by means of a rotary drive quill 38. The latter is journalled in fixed endwise position within the headstock housing 36 and slidably receives the spindle, which is longitudinally splined, for axial movement therealong. The rear end portion of the spindle extends through a tubular feed ram 39 which is slidable in a ram guide 40 extending rearwardly from the headstock housing 36. The ram guide 40 is bolted or otherwise rigidly fixed to the rear face of the headstock housing 36. The ram 39 is connected to the rear end of the spindle and serves as the feed drive coupling between the spindle feed mechanism (not shown in detail) and the spindle.

With this arrangement, the spindle 25 is disposed in substantially horizontal position in the ram guide and headstock assembly, generally indicated at 24A in FIGS. 1 and 12. The front end of the spindle is suitably shaped for rotational drive connection with a milling cutter, boring tool, or other tool or attachment. The spindle is also adapted to be projected axially out of the headstock housing 36 either into any predetermined fixed extended position of adjustment or in a feeding translation within its range of axial movement.

As pointed out above, in boring and milling machines there has existed for many years heretofore the problem of vibration and chatter at the cutting tool due to or resulting from linear vibration of the tool supporting structure. The problem manifests itself in severe chattering of the tool, excessive gear noise or gear clatter, and poor surface finish in the work. Various attempts to solve the problem mechanically through such expedients as increasing the rigidity of the machine or the workholding fixture, or through introduction of torsional vibration dampers in the drive transmission of spindle type machines, have been unsatisfactory since the problem has been found to stem from a condition of linear resonance. The more general, though inadequate, remedy has been to operate the machine at those combinations of feed and speed which avoid excessive vibration and tool chatter. This approach is undesirable due to the fact that often the combination of feed and speed selected results in a metal removal rate far below the rated capacity of the machine.

Referring, for analysis, to FIGS. 6, 7 and 8, there is shown diagrammatically the tool supporting and driving members and an associated piece of work in a horizontal boring and milling machine of the type under consideration herein. Assuming that the machine is driving a milling cutter C which is feeding horizontally relative to the work W, the cutter C is subjected to a resultant force P by the work. The horizontal component of this resultant force P is $P \cos \alpha$ where $\alpha$ is the angle between the force P and a horizontal plane tangent to the cutter. Torque load on the rotating spindle may be expressed by the formula $Pe$ where P is the resultant force and $e$ is the moment arm or perpendicular distance between the center of the cutter and the direction of the force P. Because of intermittent tooth engagement, the resultant force P and perpendicular distance $e$ vary continuously during cutter rotation. This tends to produce harmonic excitation at frequencies corresponding to the number of teeth in the cutter and also higher harmonics at multiples of such frequencies.

I have discovered that, in horizontal boring and milling machines of the exemplary type discussed above, the harmonic components of the horizontal force $P \cos \alpha$ on the cutting tool, in this instance a toothed milling cutter, produce a forced linear vibration of the ram guide and headstock assembly 24A laterally thereof in a horizontal plane. Moreover, such action sets up a vibratory resonant condition producing large linear or transverse vibratory amplitudes of the ram guide and headstock assembly and these are manifested at the cutting tool. The harmonic components of the spindle torque $Pe$ also tend to cause a forced vibration of the torsional drive system of the spindle. This, however, is not an appreciable factor in machines of the above type in that forced vibration of the torsional drive system of the spindle does not occur in a resonant or near resonant condition in such machines.

As shown diagrammatically in FIGS. 6, 7 and 8, the result of these harmonic oscillations of the ram guide is to cause the cutting tool to move axially in and out of the work, and also to move perpendicular to the axis of the spindle alternately against and with the feed. These effects tend to aggravate the above-mentioned alternating forces and torques at the frequency of oscillation of the ram guide.

I have further discovered that these adverse effects can be drastically reduced by substantially reducing the amplitudes of the lateral linear vibrations of the ram guide and headstock assembly 24A which occur at maximum amplitudes $X_a$ (FIG. 6) in the general vicinity of its natural frequency. This is accomplished by the use of a damped dynamic vibration damper situated at or adjacent the point of maximum deflection of the assembly 24A. In this instance, the damper is positioned at or adjacent the rear or outboard end of the ram guide 40 and tuned for maximum effectiveness in accordance with the formula $$f = \frac{1}{1+\frac{m}{M}} = \frac{f_a}{f_n} \qquad [\text{I}]$$

where $m/M$=ratio of the mass moment of inertia of the damper about the elastic axis of the ram guide and headstock assembly to the mass moment of inertia of the ram guide and headstock assembly about the same axis $f_a$=natural frequency of the vibration damper from the formula $$\frac{1}{2\pi} \cdot \sqrt{\frac{k}{m}} \qquad [\text{II}]$$

$f_n$=natural frequency of the main system, in this case the ram guide and headstock assembly.

In accordance with the foregoing, the illustrative machine 20 is equipped with a damped dynamic vibration damper 41 mounted on the rear or outboard end portion of the ram guide 40. Referring more specifically to FIGS. 1, 2, 3 and 5, it will be noted that, in the present instance, the damper 41 comprises an inertia member 42 in the form of a relatively heavy rectangular mass. The inertia member 42 is connected to the ram guide 40 through at least one resilient mounting member 43, there being four such members shown in FIG. 5, each possessing both spring and damping characteristics. Such members may, merely by way of example, be made of butyl rubber, a material possessing the desired characteristics. Moreover, the members 43 are so constructed that they possess the characteristics of equal stiffness in all directions, permitting the damper 41 to be tuned in both the axial and transverse directions with respect to the ram guide 40.

The inertia member 42 in this case is fashioned in the form of a rectangular block having a face area almost equal to that of the associated end of the ram guide. The illustrative member 42 has a pair of vertically spaced, horizontal grooves 44 running transversely of its inside face (FIGS. 3, 4 and 5). Each such groove 44 is provided with a pair of longitudinally spaced bores 45 adapted to receive and snugly position the flanged outer ferrule 46 of the damped resilient mounting member 43. Each such mounting member 43 is attached to the inertia member 42 by means of a pair of cap screws 47 (FIG. 5) which engage the flanged outer ferrule 46 and appropriate tapped holes in the bottom of the groove 44. The resilient mounting members 43 are also provided with flanged inner ferrules 48, each of which is adapted to abut firmly against an outwardly projecting boss 49 fixed to the rear face of the ram guide 40 by means of welds 50 (FIGS. 3 and 4). The mounting members 43 and the inertia member 42 are attached to the ram guide 40 by means of a plurality of bolts 51 each engaging alined holes in the ferrule 48, in the end face of the ram guide 40, and in the boss 49 associated therewith.

To prevent the entry of dirt and chips, and for purposes of appearance, the damper 41 may be housed within a sheet metal cover 52. The cover is formed with a size and shape corresponding generally to that of the end of the ram guide and is detachably fixed thereto as by means of mounting screws 53.

The effectiveness of the damper 41 will be better appreciated upon reference to FIG. 9 which illustrates diagrammatically the actual performance of a Giddings & Lewis 350 series horizontal boring and milling machine with and without the damper. For test purposes, the machine was set up for face milling steel and equipped with an 8 inch diameter high speed cutter having 16 teeth. A number of cuts 3/16 x 7 inches were made at various speeds and feeds and measurements were made of vibrational amplitude, both damped and undamped, of the ram guide and headstock assembly. As shown in FIG. 9, at a spindle speed of 32 revolutions per minute, the undamped amplitude of the ram guide and headstock assembly measured respectively, 0.016, 0.0235 and 0.027 inch at successive feed rates of 7.5, 10 and 13 inches per minute. However, at the same feed rates and operating conditions, but utilizing a tuned damped dynamic damper having an inertia member with a mass of 198 pounds, the damped vibrational amplitude of the ram guide and headstock assembly measured, respectively, 0.0005, 0.001, and 0.0005 inch. This drastic reduction in ram guide and headstock assembly amplitude was, at the same time, accompanied by a substantial reduction in gear clatter and a marked improvement in surface finish.

Figure 10:
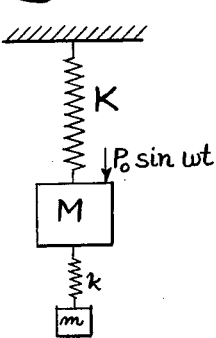
FIG. 10 is a diagrammatic view illustrating a typical undamped vibration absorber of the type commonly referred to as a "Frahm absorber"
Figure 11:
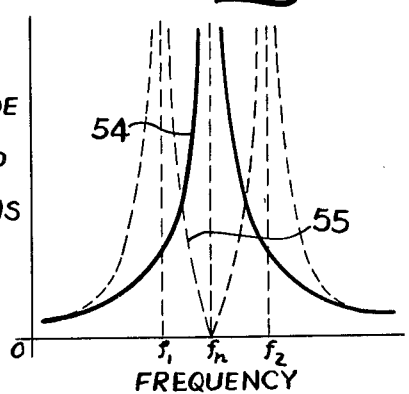
FIG. 11 is a graph illustrating, in solid lines, a typical pattern of vibrations resulting from subjecting a tool supporting structure to a vibrating force and, in broken lines, a typical pattern of vibrations for the same guide after attachment of the "Frahm absorber"

Having observed the details of the exemplary tuned damped dynamic damper 41 as applied to a conventional horizontal boring and milling machine 25 in accordance with the present invention, the foregoing advantageous results which are achieved thereby will be better understood by reference to FIGS. 10–13 considered in conjunction with the ensuing description. Thus, the ram guide and headstock assembly 24A (FIG. 1) may be diagrammatically represented by the mass M and spring K as shown in FIG. 10. When the system MK is subjected to an external disturbing force $P_0 \sin \omega t$, the mass M vibrates linearly as represented by the solid line curve 54 shown in FIG. 11. The amplitudes of the forced linear vibrations are greatest, and therefore, the most objectionable, at or near the natural or resonant frequency $f_n$ (FIG. 11) of the main system MK (i.e., of the ram guide and headstock assembly 24A).

One attempt to eliminate the problems created by forced linear vibrations included the addition of a second and smaller vibratory system $mk$ (FIG. 10) to the main system MK. This type of system, more commonly known as the "Frahm vibration absorber," is selected so that its natural frequency $f_a$ is equal to the frequency $\omega$ of the external disturbing force. As a result, the amplitudes of vibrations of the mass M in the main system MK are reduced to zero at the natural or resonant frequency $f_n$ of the main system (best illustrated by reference to the broken line curve 55 in FIG. 11). However, at the same time this serves to produce a combined vibratory system MK, $mk$ having two natural or resonant frequencies $f_1$, $f_2$. Thus, while the addition of a "Frahm absorber" is effective in reducing the amplitudes of vibrations to zero at the natural or resonant frequency $f_n$ of the main system MK, this is not a satisfactory solution to the problem because the resulting combined system has two natural frequencies $f_1$, $f_2$ at each of which the forced linear vibrations are of maximum amplitude and, therefore, particularly objectionable.

Keeping the foregoing considerations in mind, it will be observed upon inspection of FIGS. 12 and 13 conjointly that the problems of forced vibrations and tool chatter in a machine tool are substantially minimized by the proper application of a tuned damped dynamic vibration damper 41 to the machine tool in accordance with the present invention. As best shown diagrammatically in FIG. 12, the ram guide and headstock assembly 24A (or main vibratory system MK) has applied thereto a damper 41 including an inertia member 42 (or mass $m$) and a resilient mounting member 43 possessing both spring and damping characteristics (here represented by the spring $k$ and dashpot $d$, respectively). The arrangement is such that the desirable characteristics of the "Frahm absorber" (FIGS. 10 and 11) are substantially retained while the undesirable characteristics thereof are substantially eliminated. That is, the provision of a tuned damped dynamic damper 41 at or adjacent the point of maximum deflection of the ram guide and headstock assembly 24A serves not only to minimize the amplitudes of linear vibrations at or near the natural or resonant frequency $f_n$ of the assembly 24A, but it additionally insures that linear vibrations occurring at or near the natural or resonant frequencies $f_1$, $f_2$ of the combined system 24A, 41 (i.e., MK, mkd) are kept within tolerable limits. Typical results attained for a given set of conditions are depicted in FIG. 13 by the solid line curve 56.

While the invention has hereinabove been described in connection with an exemplary horizontal boring and milling machine 20, those skilled in the art will appreciate that it is equally applicable to other classes or categories of machine tools which include a vibratory tool supporting structure, irrespective of the particular axis about which the vibratory supporting structure is mounted. In each different type of tool, it is simply necessary to insure that the damped dynamic vibration damper 41 is properly tuned with respect to the natural frequency $f_n$ of the main vibratory supporting structure 24A. This may be accomplished, merely by way of example, by proper selection of the weight of the inertia member 42, by selection of a suitable resilient member 43 having the desired spring and damping characteristics, or by appropriate selection of the relative positions of the structure 24A and the damper 41.

However, while the natural or resonant frequency $f_n$ of the exemplary ram guide and headstock assembly 24A will remain substantially constant at different operating conditions of the machine tool 20 (e.g., as the tool is extended or retracted in an axial direction), those skilled in the art will appreciate that there are other types of machine tools wherein the natural or resonant frequency of the vibratory tool supporting structure will vary appreciably with changes in operating conditions. The present invention will, in the manner described below, also find advantageous use in these latter types of machine tools and will serve to effectively minimize and control linear vibrations and chatter in such tools.

Figure 14:
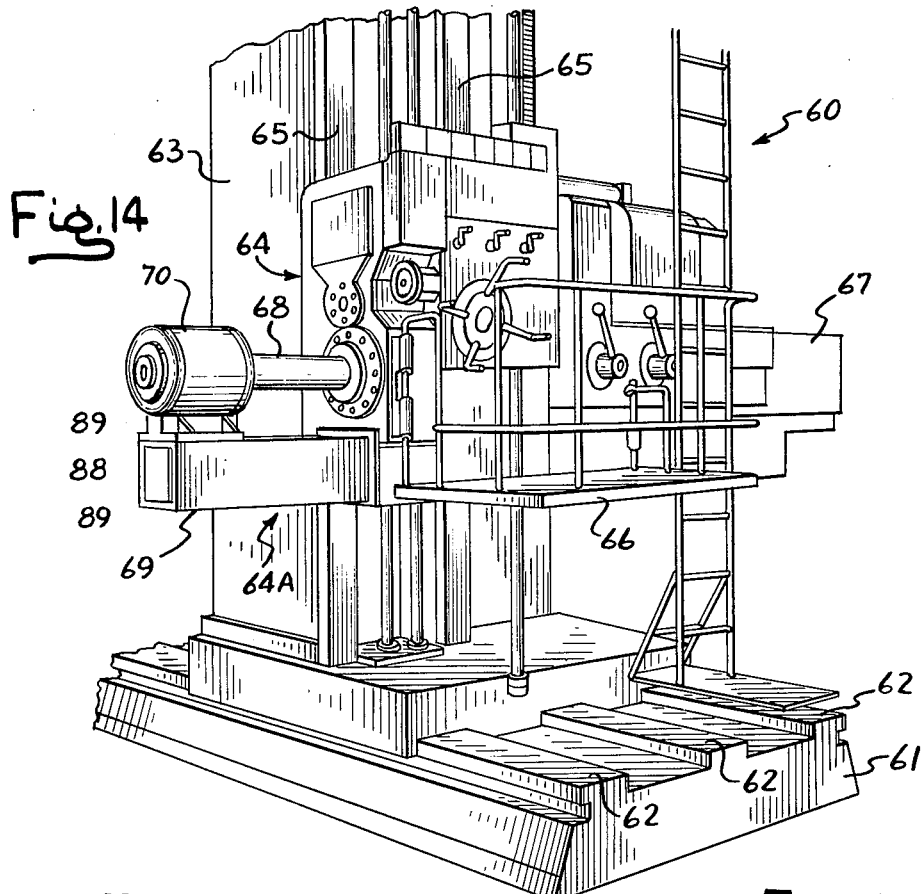
FIG. 14 is a perspective view of a horizontal boring, drilling and milling machine of the type employing an extensible underarm support, the machine here embodying a slightly modified form of the invention.

Referring more specifically to FIG. 14, the present invention is there exemplified in conjunction with a heavy duty horizontal boring, drilling and milling machine 60 having a general configuration well-known to those skilled in the art. The exemplary machine 60 in this instance comprises a bed 61 having three parallel ways 62 longitudinally formed thereon. A vertical column 63, including a column base, is disposed for movement on the ways 62 longitudinally of the bed. The column supports a headstock 64 disposed for vertical translation on ways 65 formed on the vertical column 63. Because of the size of the machine 60, a control station, including a platform 66, is secured to the ram guide 67 and casing of the headstock 64 so as to permit the operator to "ride" with the headstock. The headstock 64 supports a horizontal spindle 68 which may be rotated and translated on an axis parallel to the top of the bed 61 by extending or retracting the spindle into and out of the headstock 64. The above arrangement comprises the "working end" of the machine, which performs operations on a workpiece located adjacent the spindle on an appropriate work support (not shown).

The illustrative machine 60 is provided with an extensible underarm 69 slidably housed in the headstock 64 below and parallel to the spindle 68. The underarm and the spindle are movable axially, preferably in unison under the control of a conventional drive system (not shown), to meet the requirements of any given job—the underarm providing a running support for the spindle and its associated tools, fixtures or attachments. In the present instance, a spindle support 70 is mounted at the outboard end of the underarm (i.e., the left end as viewed in FIG. 14) and receives and supports the end of the spindle 68. The latter includes suitable means for mounting a tool and the construction of the support 70 may be such as to permit the spindle and tool to be projected axially beyond it.

When the vibratory tool support structure (generally indicated at 64A and here comprising the headstock 64, ram 67, spindle 68, underarm 69 and spindle support 70) is in a given axial position, it will have a given natural or resonant frequency $f_n$ and will undergo objectionable linear vibrations having maximum amplitude at conditions of resonance. The reasons for the production of such objectionable vibrations are the same as those previously described in connection with the illustrative horizontal boring and milling machine shown in FIG. 1. Consequently, assuming that the natural or resonant frequency $f_n$ of the structure 64A remains substantially unchanged, the problems of forced linear vibrations and chatter can be corrected in the same manner as previously described; i.e., by attaching a tuned damped dynamic vibration damper to the main vibratory structure 64A at or adjacent the point of maximum deflection. This point will depend upon the particular machine tool installation involved and might, for example, be located at the outboard end of the ram guide 67 (the right hand end as viewed in FIG. 14) or at the outboard end of the underarm 69 (the left hand end as viewed in FIG. 14).

However, since the spindle 68, underarm 69, and spindle support 70 are both extensible and retractable, and since they represent a significant portion of the mass M of the vibratory support structure 64A, axial shifting of these components relative to the headstock 64 causes an appreciable change in the natural or resonant frequency $f_n$ of the structure 64A. Therefore, in order to utilize a machine tool vibration damping system embodying the features of the present invention at optimum efficiency, provision must be made for tuning the system in accordance with the natural or resonant frequency $f_n$ corresponding to the selected one of the different possible relative axial positions of the extensible and fixed components of the structure 64A. While such tuning can be accomplished as previously described (e.g., either by varying the weight of the inertia member or by selecting a resilient mounting member having different desired spring and damping characteristics), these types of tuning procedures would be both time consuming and impractical, particularly where the machine 60 is being utilized repetitively at different operating conditions. Therefore, the present invention is also concerned with providing a tuneable damped dynamic vibration damper which may be readily adjusted in accordance with the existing natural or resonant frequency $f_n$ of the vibratory support structure 64A as the components of the latter are selectively positioned.

In keeping with this aspect of the invention, and assuming for the purposes of the ensuing description that the maximum linear deflection of the vibratory structural support 64A is occurring at or adjacent the outboard end of the underarm 69, the illustrative machine 60 is equipped with a tuneable damped dynamic vibration damper 71 mounted within the outboard end of the underarm 69. To effect the necessary tuning, provision is made for varying the relative axial positions of the inertia member and the resilient mounting member which is utilized to connect the inertia member to the underarm 60—that is, for shifting the inertia member relative to its points of constraint.

In carrying out this aspect of the invention and as best illustrated by reference to FIG. 15, the damper 71 comprises an inertia member 42′ in the form of a series of annular segments or weights 72 which are rigidly secured to a tubular sleeve 73 and which define therewith a relatively heavy cylindrical mass. The provision of a segmented inertia member 42′ is particularly advantageous during initial factory assembly since it permits addition of or removal of one or more weights 72, thus facilitating factory tuning. In the present instance, the weights 72 are secured to the sleeve 73 by means of a flange 74 welded or otherwise affixed to or integral with the outboard end of the sleeve, and a locking collar 75 secured to the inboard end of the sleeve. The inertia member 42′ is keyed to and concentrically mounted about a rod 76 with freedom for selectable translatory or axial movement therealong. The damper 71 is connected adjacent one end (here, the left or outboard end as viewed in FIG. 15) to the underarm 69 through at least one resilient mounting member 77 possessing both spring and damping characteristics, which member may be identical in function and construction with the member 43 (FIG. 3) previously described.

Accordingly, each member 77 includes a flanged inner ferrule 78 (similar to the ferrule 48 shown in FIG. 3) rigidly secured to a plate 79 integral with the rod 76, and a flanged outer ferrule 80 (similar to the ferrule 46 shown in FIG. 3) rigidly secured to a plate 81 mounted in the outboard end of the underarm 69. The opposite end of the rod 76, and therefore, the opposite end of the damper 71, is supported centrally of the underarm 69 by means of a ball and socket type connection, generally indicated at 82, secured to a mounting bracket 83 integral with the underarm. The arrangement is such that limited pivotal movement of the rod 76 relative to the bracket 83 is permitted incident to vibration of the inertia member 42′.

For the purpose of tuning the damper 71, provision is made for shifting the inertia member 42′ relative to its points of connection with the underarm 69, such points here defined by the pivotal connection 82 and the resilient mounting member 77. To this end, the outboard end of an elongate screw 84 is rotatably anchored in the plate 81 while the inboard end of the screw 84 is rotatably anchored in the bracket 83. The screw 84 passes through enlarged alined apertures 85 formed in the weights 72 and is drivingly coupled with a feed nut 86 which is anchored in the flange 74 of the inertia member 42′. In order to permit operative engagement between a crank or wrench (not shown) and the screw 84 for the purpose of shifting the feed nut 86 and inertia member 42′ axially relative to the rod 76, the outboard end of the screw is provided with a flatted surface 87.

Those skilled in the art will appreciate that operation of the screw 84 will serve to shift the inertia member 42′ relative to the connection points defined by the mounting member 77 and the ball and socket connection 82, thus varying the equivalent mass $m_e$ of the damping system 71 in accordance with the formula $$m_e = \left(\frac{a}{l}\right)^2 m \qquad [\text{III}]$$

where $m_e$ = the equivalent mass of the system,
$m$ = mass of the inertia member 42′,
$a$ = axial distance between the center of mass $m$ and the pivotal connection 82, and,
$l$ = axial distance between the points of connection defined by the mounting member 77 and the pivotal connection 82.

And, of course, the change in equivalent mass $m_e$ serves to vary the natural or resonant frequency $f_a$ of the damped dynamic vibration damper 71 since $$f_a = \frac{1}{2\pi} \cdot \sqrt{\frac{k}{m_e}} \qquad [\text{IV}]$$

thus permitting tuning of the system in accordance with Formula [I] above.

In the form of the invention, the outboard end of the underarm 69 is closed by means of a cover plate 88 which is rigidly, yet removably, secured thereto, for example, by a plurality of threaded fasteners 89. The cover plate 88 thus serves to prevent entry of dirt and chips into the interior portions of the underarm 69, while also improving the outward appearance of the machine 60. For the purpose of initial installation of the damper 71, or for tuning adjustments thereof in the field, it is merely necessary to remove the cover plate 88, thus exposing the interior portions of the underarm 69.

Referring next to FIGS. 16–19, a damping system for minimizing forced vibrations and tool chatter in machine tools is there shown in conjunction with a vertical boring mill 90, the illustrative damping system also embodying the features of the invention. In view of the similarity between the two exemplary damping systems of the invention shown in detail in FIGS. 15 and 17, like parts in both systems will be designated by identical reference numerals and those parts not common to the two systems will be designated by different reference numerals.

As shown in FIG. 16, the vertical boring mill 90, which those skilled in the art will recognize as being of a well-known type in wide commercial use, comprises a horizontally disposed bed 91 upon which is rotatably mounted a heavy duty work supporting table 92. To effect rotation of the table 92 and the work supported thereon, the table is connected to a suitable driving mechanism (not shown) housed within the bed 91.

In this type of machine, the work engaging tools, which are normally "single-point" tools, are suspended from an overhead support, generally indicated at 93 (FIG. 16), with freedom for both vertical feed and traverse operation. To this end, the overhead support 93 includes a pair of spaced, parallel, box-like, vertical columns 94 which are rigidly secured adjacent their lower ends to a rearwardly projecting portion of the machine bed 91 and which are tied together adjacent their upper ends by a reinforced box section arch 95. The arrangement is such that the bed 91, columns 94 and arch 95 define a massive unitary frame capable of supporting relatively heavy loads.

In this instance, the frame or overhead support 93 has mounted thereon a vertically adjustable cross rail 96 which is slidably mounted on spaced parallel ways 97 disposed on the front face of the vertical columns 94. The cross rail 96 is adjusted vertically by large diameter vertically disposed screws (not shown) housed within the columns 94 and driven by a suitable power driving mechanism in a manner well-known to those skilled in the art.

A pair of saddles 98, 99 are slidably mounted on spaced parallel ways 100 formed on the front face of the cross rail 96, the saddles each being coupled to suitable drive mechanisms (not shown) for independent lateral feed and traverse movement in a horizontal direction along the ways 100. In the exemplary mill 90, the saddles 98, 99 respectively carry elongate ram guides 101, 102 which serve to respectively support extensible and retractable rams 103, 104 for controlled longitudinal movement therethrough. Suitable tool holders 105 are carried at the lower ends of the rams 103, 104.

While, for the purpose of an understanding of the present form of the invention, the rams 103, 104 and their supporting structure may be considered substantially identical, those skilled in the art will appreciate that at least one ram guide (here ram guide 101) is normally mounted for swivelling movement about a swivel connection, generally indicated at 106. Thus, the connection 106 includes a worm and worm gear segment (not shown in detail) which permit of angular shifting of the ram guide 101 and ram 103 from a vertical position (as shown in FIG. 16) to an inclined position more suitable for taper machining operations. Ram guide 102, on the other hand, is normally rigidly secured to its saddle 99 and the extensible ram 104 associated therewith may, as here shown, simply support a tool holder 105 at its lower end or, alternatively, it may support a conventional turret head (not shown).

Since the particular means employed for effecting vertical movement of the rams 103, 104, and for locking such rams in position, are not critical to the present invention and are well-known to those skilled in the art, they will not be treated in detail. It should suffice to state that the rams 103, 104 are capable of independent controlled movement and, to this end, include integral gear racks 107 which are connected to suitable drive means (e.g., a driven worm gear, or the like, not shown) carried by the ram guides 101, 102.

In operation, the various feed and drive mechanisms are controlled by an operator from a remote station 108, thus properly positioning the rams and their associated tools for the particular machining operation involved. The amount of extension of the rams 103, 104 will, of course, depend upon various factors such as, merely by way of example, the size and shape of the workpiece, or the particular operation to be performed. However, with large vertical mills 60 of the type hereinabove described, it is not uncommon to be operating with ram extensions up to approximately eight feet. Therefore, since the saddle 98, ram guide 101, ram 103, and the saddle 99, ram guide 102, ram 104 respectively define vibratory structural supports 98A and 99A, significant linear vibration problems are often encountered and, these problems are magnified as the rams are moved toward the limits of permissible extension.

In keeping with the invention, the illustrative vertical boring mill 90 is provided with at least one tuneable damped dynamic vibration damper 71' (shown in detail in FIG. 17) which is preferably applied to, for example, the vibratory structural support 98A at or adjacent the point of maximum deflection. Under normal operating conditions (particularly with a machine of the type here shown by way of illustration), this point will be at or adjacent the lower or extended end of the ram 103 and, consequently, the damper 71' is shown in FIG. 17 as housed within the lower end of the rectangular ram 103. Of course, it will be understood that a damping system may also be applied to the other vibratory structural support 99A in accordance with the invention, if desired. However, since the operation of each of twin damping systems disposed in the rams 103, 104 would be substantially identical, the constructional details and mode of operation of only the system associated with the support 98A is herein described.

The tuneable damped dynamic vibration damper 71' shown in FIG. 17 is substantially identical in construction and operation to the damper 71 shown and described in detail above in conjunction with FIG. 15. However, since in this instance the sleeve 73 and rod 76 are normally disposed on either a vertical or inclined axis, the weights 72 are gravity biased towards the flange 74 on the outboard end of the sleeve 73. Therefore, the collar 75 which is shown in FIG. 15 and which there provides an inboard stop for the weights 72, need not be used in this illustrative form (FIG. 17) of the invention. When the damper 71' (FIG. 17) is tuned to the natural or resonant frequency $f_n$ of the vibratory structural support 98A, it will, of course, function in the manner previously described for the damper 71 (FIG. 15) to minimize linear vibration and tool chatter. However, as the ram 103 is extended (or retracted), the natural or resonant frequency $f_n$ of the support 98A will vary.

In order to maintain the damper system properly tuned for different amounts of ram extension, provision is made for adjusting or shifting the inertia member 42' (FIG. 17) relative to its points of axial constraint, i.e., relative to connections 77 and 82. In this form of the invention, and as best illustrated by reference to FIGS. 17 and 18 conjointly, the adjustment mechanism comprises a windlass, generally indicated at 110 (FIG. 18), which is supported on the upper end of the ram 103.

The windlass includes a drum 111 mounted on and keyed to a shaft 112, the latter being rotatably journalled in a support bracket 113 carried by the ram 103. The outboard end of the shaft is operatively coupled to a hand crank 114. A cable 115, having one end rigidly secured to the drum 111, is trained about a pair of sprockets 116 on the upper end of the ram. The opposite end of the cable 115 is firmly anchored to the inertia member 42' as, for example, by means of a connector 117 coupled to a rod 118, the latter being rigidly secured to the flange 74 and passing through the enlarged alined apertures 85 formed in the weights 72.

The arrangement is such that rotation of the hand crank 114 serves to wind and unwind the cable 115 on the drum, thus shifting the inertia member 42' relative to its points of axial constraint and varying the equivalent mass $m_e$ of the system 71' in accordance with Formula [III] above. This serves to vary the natural frequency $f_a$ of the damper system 71' and permits tuning of the equipment in accordance with Formula [I] above.

Provision is also made for locking the drum 111 against "free-wheeling" so that the inertia member 42' is maintained in a selected position relative to its points of axial constraint. As best illustrated in FIGS. 18 and 19, this is accomplished by providing a ratchet wheel 119 which is keyed to the shaft 112 for simultaneous rotation therewith. The ratchet wheel 119 is provided with a plurality of equidistantly spaced peripheral detent notches 120 positioned to be operatively engaged one at a time by a latching detent 121.

In the exemplary device, the detent 121 is slidably and non-rotatably positioned within a bore 122 formed in a flange-like block 123 mounted on the bracket 113. The detent 121 includes a projecting portion 124 of reduced diameter which defines with the detent a radial shoulder 125. The projecting portion 124 passes outwardly through a cover plate 126 secured to the block 123 and an operating knob 127 is affixed to the outwardly projecting portion. The detent 121 is normally biased into latched engagement with the ratchet wheel 119 by means of a compression spring 128 concentrically mounted about the detent portion 124 and having its opposite ends bottomed on the shoulder 125 and plate 126. The arrangement is such that during a cable winding operation, mating cam surfaces 129, 130 formed on the detent 121 and wheel 119 respectively permit free rotation of the drum 111. However, rotation of the drum in the opposite direction is inhibited by means of mating latch surfaces 131, 132 formed on the detent 121 and wheel 119 respectively. To unwind the cable 115, it is merely necessary to grasp the operating knob 127 and pull the detent 121 outwardly against the bias of spring 128, thus freeing the detent from engagement with the ratchet wheel.

It is to be noted that in those instances where the machining operation involves the use of, for example, a milling cutter or similar toothed or "multi-point" tool, the exciting frequency $\omega$, which induces linear vibration of the vibratory tool support, is determined by the number of teeth in the tool and by the rotational speed of the spindle. Stated another way, the vibrations are caused by "forced excitation." However, where the machining operation involves the use of a "single-point" cutting tool of the type normally employed with turning equipment such as the exemplary mill 90 (FIG. 16), linear vibration of the vibratory tool support is "self-excited." Therefore, tool chatter occurs only at the natural frequency $f_n$ of the vibratory tool support. In either case, however, I have discovered that the major problem heretofore encountered has been one stemming from substantially linear vibrations which are particularly objectionable at or near the natural frequency $f_n$ of the vibratory tool support, and this is true whether the vibrations are caused by "forced excitation" or "self-excitation." Moreover, I have also discovered that, irrespective of the type of excitation involved, the amplitudes of such linear vibrations can be substantially reduced by applying a tuned, or tuneable, damped dynamic vibration damper to the vibratory tool support structure at or adjacent the point of maximum deflection thereof. The damping system will find equally advantageous use with vibratory tool supports having either substantially constant natural frequencies or variable natural frequencies.

I claim as my invention:

1. In combination with a machine tool having a base, an elongate vibratory structural support having an equivalent mass M, said support being carried by the base and having a natural frequency $f_n$, means for securing a tool to said vibratory structural support adjacent one end thereof whereby said support vibrates linearly as a result of forcing frequencies induced by operative engagement of the tool with an associated workpiece, and a vibration damper having a natural frequency $f_a$ for damping the vibrations of said vibratory structural support, said damper including an inertia member having a mass $m$ and means for resiliently mounting said member to said support, said resilient mounting means having both spring characteristics and damping characteristics so that said vibration damper is operable to substantially reduce the maximum amplitudes of linear vibrations induced in said support over the entire range of forcing frequencies, said spring characteristics and mass $m$ being selected so that $f_a$ is substantially equal to $f_n/1+m/M$.

2. In combination with a machine tool having a base and a vertical support column mounted thereon, an elongate vibratory structural support having an equivalent mass M, said support being carried by the column and having a natural frequency $f_n$, means for securing a tool to said vibratory structural support adjacent one end thereof whereby said support vibrates linearly as a result of forcing frequencies induced by operative engagement of the tool with an associated workpiece, and a vibration damper having a natural frequency $f_a$ for damping linear vibrations of said vibratory structural support, said damper including an inertia member having a mass $m$ and means for resiliently mounting said member to said support adjacent the point of maximum vibratory deflection thereof, said resilient mounting means being of equal stiffness in all directions so that said vibration damper is operable in all directions of vibration, said resilient mounting means having both spring characteristics and damping characteristics so that said vibration damper is operable to substantially reduce the maximum amplitudes of linear vibrations induced in said support over the entire range of forcing frequencies, said spring characteristics and mass $m$ being selected so that $f_a$ is substantially equal to $f_n/1+m/M$.

3. In combination with a machine tool having a base and a vertical support column mounted thereon, an elongate vibratory structural support having an equivalent mass M, said support being carried by the column and having a natural frequency $f_n$, means for securing a tool to said vibratory structural support adjacent one end thereof, and a vibration damper having a natural frequency $f_a$ for damping linear vibrations of said vibratory structural support, said damper including an inertia member having a mass $m$ and a resilient mounting element for coupling said member to said support adjacent the point of maximum vibratory deflection thereof, said resilient mounting element having both spring characteristics and damping characteristics so that said vibration damper is operable in all directions of vibration to substantially reduce the amplitudes of linear vibrations induced in said support, said spring characteristics and mass $m$ being selected so that $f_a$ is substantially equal to $f_n/1+m/M$.

4. The combination as set forth in claim 3 further characterized in that said mounting element is formed of butyl rubber.

5. In combination with a machine tool having a base and a vertical support column mounted thereon, an elongate vibratory structural support having an equivalent mass M, said support being carried by the column and having a natural frequency $f_a$, means for securing a tool to said vibratory structural support adjacent one end thereof, and a vibration damper having a natural frequency $f_n$ for damping vibrations of said vibratory structural support, said damper including an inertia member having a mass $m$ and means for resiliently mounting said member to said support adjacent the point of maximum vibratory deflection thereof, said resilient mounting means including a plurality of resilient mounting elements each being of equal stiffness in all directions so that said vibration damper is operable in all directions of vibration, said resilient mounting elements having both spring characteristics and damping characteristics so that said vibration damper is operable to substantially reduce the maximum amplitudes of linear vibrations induced in said support, said spring characteristics and mass $m$ being selected so that $f_a$ is substantially equal to $f_n/1+m/M$.

6. In combination with a machine tool having a base and a vertical support column mounted thereon, an elongate vibratory structural support having an equivalent mass M, said support being carried by the column and having a natural frequency $f_n$, means for securing a tool to said vibratory structural support adjacent one end thereof whereby said support vibrates linearly as a result of forcing frequencies induced by operative engagement of the tool with an associated workpiece, and a vibration damper having a natural frequency $f_a$ for damping the linear vibrations of said vibratory structural support, said damper including an inertial member having a mass $m$ and means for resiliently mounting said member to the opposite end of said support, said resilient mounting means having both spring characteristics and damping characteristics so that said vibration damper is operable in all directions of vibration to substantially reduce the maximum amplitudes of linear vibrations induced in said support over the entire range of forcing frequencies, said spring characteristics and mass $m$ being selected so that $f_a$ is substantially equal to $f_n/1+m/M$.

7. In combination with a machine tool having a base and a vertical support column mounted thereon, an elongate vibratory structural support having an equivalent mass M, said support being carried by the column and having a natural frequency $f_n$, said support including a ram and means for selectively extending and retracting said ram towards and away from an associated workpiece, a tool secured to the ram for operative engagement with the workpiece, and a vibration damper having a natural frequency $f_a$ for damping forced linear vibrations and self-excited vibrations of said vibratory structural support which are induced by selective use of toothed and single-point tools respectively, said damper including an inertia member having a mass $m$ and means for resiliently mounting said member to said support adjacent the point of maximum vibratory deflection thereof, said resilient mounting means having both spring characteristics and damping characteristics so that said vibration damper is operable in all directions of vibration to substantially reduce the amplitudes of linear vibrations induced in said support, said spring characteristics and mass $m$ being selected so that $f_a$ is substantially equal to $f_n/1+m/M$.

8. In combination with a machine tool having a base, an elongate vibratory structural support carried by the base, said vibratory structural support including a ram and means for extending and retracting said ram axially thereof, means for securing a tool to said ram adjacent one end thereof, said vibratory support having different resonant frequencies respectively corresponding to different amounts of axial extension of said ram, means for damping vibrations of said vibratory support including an inertia member and means for resiliently mounting said member to said support adjacent the point of maximum vibratory deflection thereof, said resilient mounting means having both spring and damping characteristics and being operable in all planes of vibration, and means for selectively adjusting the resonant frequency of said damping means for tuning the latter in accordance with the existing resonant frequency of said vibratory support at any given axial position of said ram.

9. In combination with a machine tool having a base and a vertical support column mounted thereon, an elongate vibratory structural support carried by the column, said vibratory structural support including a ram and means for extending and retracting said ram axially thereof, means for securing a tool to said ram adjacent one end thereof, said vibratory support having different resonant frequencies respectively corresponding to different amounts of axial extension of said ram, means for damping vibrations of said vibratory support including an inertia member and means for resiliently mounting said member to said support adjacent the point of maximum vibratory deflection thereof, said resilient mounting means having both spring and damping characteristics and being operable in all planes of vibration, and means for shifting said inertia member relative to said resilient mounting means so as to vary the equivalent mass of said damping means whereby the resonant frequency of said damping means is selectively adjusted for tuning the latter in accordance with the resonant frequency of said vibratory support.

10. In combination with a machine tool having a base and a vertical support column mounted thereon, an elongate vibratory structural support carried by the column, said vibratory structural support including a ram, means for securing a tool to said ram adjacent one end thereof, and means for extending and retracting said ram in an axial direction, said vibratory support having different resonant frequencies respectively corresponding to different amounts of axial extension of said ram, means for damping vibrations of said vibratory support, said damping means including an inertia member, means for resiliently mounting one end of said member to said support adjacent the point of maximum vibratory deflection thereof, means for pivotally mounting the opposite end of said inertia member to said support, said resilient mounting means having both spring and damping characteristics and being operable in all planes of vibration, and means for selectively shifting said inertia member relative to its resilient and pivotal mounts for adjusting the resonant frequency of said damping means so as to tune the latter in accordance with the resonant frequency of said vibratory support.

11. In combination with a boring and milling machine having a headstock mounted for movement on a vertical column, a ram mounted on said headstock for controlled axial movement relative thereto, said ram having one of its opposite ends projecting from said headstock, a ram guide rigidly secured to said headstock and housing the projecting end of said ram, means secured to the opposite end of said ram for rigidly holding a tool, said headstock, ram, ram guide and tool holding means defining a vibratory structural support having an equivalent mass M and a natural frequency $f_n$ whereby said support vibrates linearly as a result of forcing frequencies induced by operative engagement of the tool with an associated workpiece with the linear vibrations of said support being of maximum amplitude at the resonant frequency of said support, and a damped dynamic vibration damper having a natural frequency $f_a$ coupled to said support adjacent the point of maximum linear deflection thereof, said damper including an inertia member having a mass $m$ and means for resiliency mounting said member to said support, said resilient mounting means having both spring characteristics and damping characteristics so that said vibration damper effects substantial reduction of the maximum amplitudes of said linear vibrations over the entire range of forcing frequencies, said spring characteristics and mass $m$ being selected so that $f_a$ is substantially equal to $f_n/1+m/M$.

12. The combination set forth in claim 11 further characterized in that said damper is coupled to the projecting end of said guide.

13. In combination with a horizontal boring and milling machine having a headstock mounted for movement on a vertical column, a ram mounted on said headstock for controlled axial movement relative thereto, said ram having one of its opposite ends projecting from said headstock, a ram guide rigidly secured to and projecting from said headstock and housing the projecting end of said ram, a spindle secured to the opposite end of said ram for rigidly holding a tool, a massive underarm slidably mounted on and projecting from said headstock and parallel with said spindle, said underarm including support means coupled with said spindle for providing a running support therefor, said headstock, ram, ram guide, spindle, underarm and support means defining a vibratory structural support having an equivalent mass M and a natural frequency $f_n$ whereby said support vibrates linearly as a result of forcing frequencies induced by operative engagement of the tool with an associated workpiece with the linear vibrations of said vibratory support being of maximum amplitude at the resonant frequency of said vibratory support, and a damped dynamic vibration damper having a natural frequency $f_a$ coupled to said vibratory support adjacent the point of maximum linear deflection thereof, said damper including an inertia member having a mass $m$ and means for resiliently mounting said member to said support, said resilient mounting means having both spring characteristics and damping characteristics and being operable in all directions of vibration so that said vibration damper effects substantial reduction of the maximum amplitudes of said linear vibrations over a wide range of forcing frequencies, said spring characteristics and mass $m$ being selected so that $f_a$ is substantially equal to $f_n/1+m/M$.

14. The combination as set forth in claim 13 further characterized in that said damper is coupled to the projecting end of said guide.

15. The combination as set forth in claim 13 further characterized in that said damper is coupled to the projecting end of said underarm.

16. In combination with a horizontal boring and milling machine having a headstock mounted for movement on a vertical column, a ram mounted on said headstock for controlled axial movement relative thereto, said ram having one of its opposite ends projecting from said headstock, a ram guide rigidly secured to and projecting from said headstock and housing the projecting end of said ram, a spindle secured to the opposite end of said ram for rigidly holding a tool, a massive underarm, slidably mounted on and projecting from said headstock and parallel with said spindle, said underarm including support means coupled with said spindle for providing a running support therefor, said headstock, ram, ram guide, spindle, underarm and support means defining a vibratory structural support, means for shifting said ram, said spindle, and said underarm axially relative to said headstock, said vibratory support having a different resonant frequency for each different axial position of the ram, spindle and underarm so that engagement of the tool with an associated workpiece imparts linear vibrations to said vibratory support which are of maximum amplitude at the existing resonant frequency of said vibratory support, a damped dynamic vibration damper coupled to said vibratory support adjacent the point of maximum linear deflection thereof, said damper including an inertia member and means for resiliently mounting said member to said support, said resilient mounting means having both spring and damping characteristics, and means for varying the resonant frequency of said damper in accordance with the existing resonant frequency of said vibratory support so as to permit tuning of said damper at each different axial position of the tool.

17. The combination set forth in claim 16 further characterized in that said inertia member is disposed within said underarm.

18. The combination set forth in claim 17 further characterized in that said inertia member is pivotally connected adjacent one of its ends to said underarm, the opposite end of said inertia member being coupled to said underarm by said resilient mounting means.

19. The combination set forth in claim 18 further characterized in that said inertia member is selectively shiftable relative to its pivotal and resilient connections with said underarm.

20. In combination with a vertical boring mill of the type having a cross rail mounted for vertical movement on spaced parallel vertical columns, a work table disposed beneath said cross rail for supporting an associated workpiece, means for rotationally driving said table and the workpiece supported thereon, a saddle mounted on said cross rail for horizontal movement therealong, a ram guide mounted on said saddle, a ram supported by said guide, said ram including means for holding a tool, said saddle, guide and ram defining a vibratory structural support having an equivalent mass M and a natural frequency $f_n$ whereby said support vibrates linearly as a result of forcing frequencies induced by operative engagement of the tool with the associated workpiece with the linear vibration of said support being of maximum amplitude at the resonant frequency of said support, and a damped dynamic vibration damper having a natural frequency $f_a$ coupled to said support adjacent the point of maximum linear deflection thereof, said damper including an inertia member having a mass $m$ and means for resiliently mounting said member to said support, said resilient mounting means having both spring characteristics and damping characteristics so that said vibration damper effects substantial reduction of the maximum amplitudes of said linear vibrations over a wide range of forcing frequencies, said spring characteristics and mass $m$ being selected so that $f_a$ is substantially equal to $f_n/1+m/M$.

21. In combination with a vertical boring mill of the type having a cross rail mounted for vertical movement on spaced parallel vertical columns, a work table disposed beneath said cross rail for supporting an associated workpiece, means for rotationally driving said table and the workpiece supported thereon, a saddle mounted on said cross rail for horizontal movement therealong, a ram guide swively mounted on said saddle, a ram supported by said guide, said ram including means for holding a tool, said saddle, guide and ram defining a vibratory structural support having an equivalent mass M and a natural frequency $f_n$ whereby said support vibrates linearly as a result of forcing frequencies induced by operative engagement of the tool with the associated workpiece with the linear vibrations of said support being of maximum amplitude at the resonant frequency of said support, and a damped dynamic vibration damper having a natural frequency $f_a$ coupled to said support adjacent the point of maximum linear deflection thereof, said damper including an inertia member having a mass $m$ and means for resiliently mounting said member to said support, said resilient mounting means being of equal stiffness in all directions so that said vibration damper is operable in all directions of vibration, said resilient mounting means having both spring characteristics and damping characteristics so that said vibration damper is operable to substantially reduce the maximum amplitudes of linear vibrations induced in said support over a wide range of forcing frequencies, said spring characteristics and mass $m$ being selected so that $f_a$ is substantially equal to $f_n/1+m/M$.

22. In combination with a vertical boring mill of the type having a cross rail mounted for vertical movement on spaced parallel vertical columns, a work table disposed beneath said cross rail for supporting an associated workpiece, means for rotationally driving said table and the workpiece supported thereon, a saddle mounted on said cross rail for horizontal movement therealong, a ram guide mounted on said saddle, a ram supported by said guide, said ram including means for holding a tool, means for selectively extending and retracting said ram axially relative to said guide, said saddle, guide and ram defining a vibratory structural support having a different resonant frequency at each axial position of said ram so that engagement of the tool with the associated workpiece imparts linear vibrations to said support which are of maximum amplitude at the existing resonant frequency of said support as determined by the selected axial position of said ram, a damped dynamic vibration damper coupled to said support adjacent the point of maximum linear deflection thereof, said damper including an inertia member and means for resiliently mounting said member to said support, said resilient mounting means having both spring and damping characteristics, and means for varying the resonant frequency of said damper in accordance with the existing resonant frequency of said vibratory support, so as to permit tuning of said damper at each different axial position of said ram.

23. In combination with a vertical boring mill of the type having a cross rail mounted for vertical movement on spaced parallel vertical columns, a work table disposed beneath said cross rail for supporting an associated workpiece, means for rotationally driving said table and the workpiece supported thereon, a saddle mounted on said cross rail for horizontal movement therealong, a ram guide mounted on said saddle, a ram supported by said guide, said ram including means for holding a tool, means for selectively extending and retracting said ram axially relative to said guide, said saddle, guide and ram defining a vibratory structural support having a different resonant frequency at each axial position of said ram so that engagement of the tool with the associated workpiece imparts linear vibrations to said support which are of maximum amplitude at the existing resonant frequency of said support as determined by the selected axial position of said ram, and a damped dynamic vibration damper disposed within said ram adjacent the point of maximum linear deflection thereof, said damper including an inertia member, means for resiliently mounting one end of said member to said ram and means for pivotally mounting the other end of said member to said ram, said resilient mounting means having both spring and damping characteristics, the means for shifting said inertia member axially relative to its pivotal and resilient mounting means to effect tuning of said damper.

24. In combination with a machine tool having a base, an elongate vibratory structural support having an equivalent mass M, said support being carried by the base and having a natural frequency $f_n$, means for securing a tool to said vibratory structural support adjacent one end thereof whereby said support vibrates linearly as a result of forcing frequencies induced by operative engagement of the tool with an associated workpiece, and a vibration damper having a natural frequency $f_a$ for damping the vibrations of said vibratory structural support, said damper including an inertia member having a mass $m$ and means for resiliently mounting said member to said support adjacent the point of maximum vibratory deflection thereof, said resilient mounting means having both spring characteristics and damping characteristics so that said vibration damper is operable to substantially reduce the maximum amplitudes of linear vibrations induced in said support over the entire range of forcing frequencies, said spring characteristics and mass $m$ being selected so that $f_a$ is substantially equal to $f_n/1+m/M$.

References Cited by the Examiner

UNITED STATES PATENTS

| | | | |
|---|---|---|---|
| 1,965,224 | 7/1934 | Ernst et al. | 90—11 |
| 2,051,954 | 8/1936 | Leland. | |
| 2,275,783 | 3/1942 | Martellotti | 90—20.5 |
| 2,412,499 | 12/1946 | Ernst et al. | 90—11 |
| 2,655,049 | 10/1953 | Cole. | |
| 2,656,742 | 10/1953 | Poole. | |

(Other references on following page)

| | | UNITED STATES PATENTS | |
|---|---|---|---|
| 2,699,695 | 1/1955 | Addison. | |
| 2,714,823 | 8/1955 | Dall et al. | 90—11 X |
| 2,730,021 | 1/1956 | Gallimore et al. | 90—20.5 |
| 2,931,464 | 4/1960 | Zwick | 188—83 |
| 2,960,189 | 11/1960 | Osburn | 90—20.5 X |
| 2,976,962 | 3/1961 | Pegard. | |
| 3,059,727 | 10/1962 | Fuchs. | |

FOREIGN PATENTS

| 763,753 | 12/1956 | Great Britain. |
|---|---|---|
| 763,754 | 12/1956 | Great Britain. |

WILLIAM W. DYER, JR., *Primary Examiner.*